United States Patent
Luciani et al.

[11] Patent Number: 6,165,928
[45] Date of Patent: *Dec. 26, 2000

[54] SUPPORTED CATALYST FOR OLEFIN POLYMERIZATION

[75] Inventors: Luciano Luciani, Ferrara, Italy; Wolfgang Neissl, Lichtenberg; Birgit Wenidoppler, Gallspach, both of Austria

[73] Assignee: Borealis G.m.b.H., Schwechat-Mannswörth, Austria

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,121

[22] Filed: Dec. 2, 1996

[30] Foreign Application Priority Data

Dec. 1, 1995 [EP] European Pat. Off. ............. 95118945

[51] Int. Cl.$^7$ ..................................... B01J 31/38
[52] U.S. Cl. ......................... 502/104; 502/113; 502/115; 502/120; 526/351; 526/119
[58] Field of Search .................................. 502/104, 113, 502/115, 120

[56] References Cited

U.S. PATENT DOCUMENTS

| | | |
|---|---|---|
| 4,226,741 | 10/1980 | Luciani et al. . |
| 4,284,748 | 8/1981 | Welch ..................................... 526/119 |
| 4,442,225 | 4/1984 | Takitani et al. ......................... 502/112 |
| 4,673,661 | 6/1987 | Löfgren et al. . |
| 4,942,148 | 7/1990 | Furuhashi et al. ...................... 502/115 |
| 5,006,620 | 4/1991 | Zolk et al. . |
| 5,036,147 | 7/1991 | Meverden et al. ...................... 526/119 |
| 5,310,716 | 5/1994 | Luciani et al. .......................... 502/107 |

FOREIGN PATENT DOCUMENTS

| | | |
|---|---|---|
| 0 101 978 | 3/1984 | European Pat. Off. . |
| 0 474 249 | 3/1992 | European Pat. Off. . |
| 0 494 084 | 7/1992 | European Pat. Off. . |
| 0 595 574 | 5/1994 | European Pat. Off. . |
| 1387890 | 3/1975 | United Kingdom . |

*Primary Examiner*—David W. Wu
*Assistant Examiner*—Caixia Lu
*Attorney, Agent, or Firm*—Wenderoth, Lind & Ponack, L.L.P.

[57] ABSTRACT

Procedure for the preparation of a solid catalyst component which is active in the polymerization of olefins, comprising the steps:

a) contacting a dehydrated silica support with a solution of Mg-halide or Mg-alkyl-halide or a mixture of both, optionally in the presence of and Ti-alkoxyde or Ti-halogen-alkoxyde or a mixture of both, b) contacting the catalyst-precursor obtained in (a) with Mg-alkyl or Mg-alkyl-halide or a mixture of both, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors, e) recovering the solid catalyst-component from the reaction products of step (d).

The catalyst component, which is obtained according to the above procedure, may also be used together with Al-trialkyl or Al-alkyl-halides and a Lewis base, as a catalyst for the polymerization of olefins.

14 Claims, No Drawings

006,165,928

SUPPORTED CATALYST FOR OLEFIN POLYMERIZATION

The present invention relates to a procedure for producing a solid catalyst component for polymerizing α-olefins alone or in mixture.

α-Olefins such as propylene and higher olefine monomers can be polymerized using Ziegler-Natta-catalysts based on an organometallic compound of elements of groups IA to IIIA and a compound of a transition metal belonging to groups IVA to VIA of the Periodic Table. Definition on Ziegler-Natta-catalysts can be found in literature, e.g. in the book: Boor Jr, Ziegler-Natta-catalysts and Polymerization, Academic Press. New York, 1979. Highly active and highly stereospecific catalysts in the polymerization of α-olefins, particularly propylene, are described in many patents, e.g. in British Pat. 1,387,890, where the use of trialkyl-Al (partially complexed with an electron donor compound) and the product obtained by grinding a mixture of a Mg-dihalide, an electron donor compound and a halogenated Ti-compound are provided.

More recently other patents like U.S. Pat. No. 4,226,741 and U.S. Pat. No. 4,673,661 show new ways for improving the performance and the preparation of the catalyst of the above mentioned patent. In U.S. Pat. No. 5,310,716, the utilization of inorganic carriers as supports (besides the use of Mg-dihalide) has been proposed.

In U.S. Pat. No. 5,006,620 (among others), the use of inorganic carriers (supports) in presence of Mg-alkyls has been described. According to this patent, a catalyst-component for the polymerization of olefins is obtained by treating a silica in suspension with an organic Mg-compound, a gaseous chlorinating agent selected from chlorine and hydrochloric acid, a derivative of phthalic acid, a $C_{1-8}$ alkanol and Ti-tetrachloride.

Other proposals have been made in the art for improving the performance of catalytic systems. These proposals include modifications of the components of the catalytic systems by introducing further chemicals, e.g. typically Lewis bases, and using salts of a transition metal, in presence of a halide of a bivalent metal like Mg-dichloride, alone or additionally in presence of organic or inorganic carriers.

In the field of catalyst research it is still strongly desirable to find new catalyst components or catalyst systems with improved performance, especially with high activity and/or high stereoregularity.

According to the present invention, it has now been found that silica can interact in two steps with Mg-halide, optionally in the presence of Ti-alkoxide (or Ti-halogenoalkoxide), and an organic Mg-alkyl compound and chlorinated hydrocarbons. It has also been found that the precursor, obtained as mentioned above and containing silica, Mg-halide or Mg-alkyl-halide and optionally a Ti-compound, can interact with Ti-tetrahalide and with a Lewis base to give a solid catalyst-component which is highly active in the polymerization of olefins to stereoregular polymers.

The present invention accordingly provides a process for the preparation of a solid catalyst component which is active in the polymerization of olefins, comprising the steps:

a) contacting a silica support with a solution of Mg-halide or Mg-alkyl-halide or a mixture of both, optionally in the presence of Ti-alkoxide or Ti halide-alkoxide or a mixture of both, b) contacting the catalyst-precursor obtained in (a) with Mg-alkyl or Mg-alkyl-halide or a mixture of both, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors, e) recovering the solid catalyst-component from the reaction products of step (d).

Thus, Mg-halide is the reagent in the first reaction step (a), Mg-alkyl or Mg-alkylhalide is the reagent in the second reaction step (b), and the halogenation with, e.g., chlorinated hydrocarbons, is a further reaction step (c).

According to the present invention (concerning the preparation of an active solid component of a catalytic system, containing a silica carrier, a catalytically active part based on magnesium, halogen, titanium and Lewis bases and particularly suited for polymerizing α-olefins alone or in mixture, especially propylene into stereoregular polymers) the procedure will preferably comprise:

1. A thermal treatment of a non activated silica to eliminate totally or partially hydroxyl groups.
2. Contacting of said silica with a solution of Mg-dihalide, optionally in the presence of Ti-alkoxide (or Ti-halide-alkoxide) in an organic solvent, operating with a weight ratio between the magnesium compound and silica of for instance 0.02 m to 10 g, and between the titanium compound, if present, and silica of for instance 0.06 m to 10 g, at a temperature ranging from 15° C. to the boiling point of the diluent, for the time necessary first to solubilize the solid salts of Mg and Ti, and then to deposit these compounds into the silica.
3. Contacting of the above composition, after removal of the diluent via distillation, with a solution of a Mg-dialkyl or Mg-halide-alkyl in an inert hydrocarbon solvent, operating with a weight ratio between Mg compound and silica of, for instance, 60 mM to 10 g, at a temperature from 15° C. to the boiling point of the liquid phase for a period necessary to let deposit totally or partially the magnesium compound on the silica. In this step, an amount of Lewis bases (electron donor) is preferably added to the hydrocarbon in a weight ratio between Lewis bases and silica for instance of 8.5 mM to 10 g.
4. Halogenation of the above composition by a treatment with halogenating agents especially selected e.g. from hydrocarbon halides, and operating in excess of this diluent at a temperature of −20° C. to 120° C. and for a period of 0.25 to 10 hours.
5. Treatment of the above obtained composition with an excess of Ti-tetrahalide either alone or in solution with hydrocarbon halides in presence of a Lewis base in a weight ratio between silica and Lewis base of e.g. 10 g to 8.5 mM.

The titanation of the precursor, halogenated as above described, is carried out preferably at temperatures from 80° C. to 130° C. for a period of 0.25 to 10 hours.

6. Recovery of the above obtained solid catalytic system after washing with hydrocarbon diluent and drying.

The first step of the preparation is dealing with silica treatments. The silica suitable as a carrier, is preferably microspheroidal and porous, with a particle size of 15 to 150 μm, with a surface area of 100 to 500 m²/g, a pore volume of 1.2 to 3.0 ml/g and an average pore diameter of 20 to 500 A. The silica has been thermally pretreated e.g. at 725° C. for 8 hours.

In the second step of the procedure according to the present invention, the silica, as treated above, is suspended in a solution of Mg-compounds and optionally Ti-alkoxide in a solvent e.g. ethylacetate.

The Mg-compounds suitable for this purpose are those defined by the formulae $MgX_2$ or $MgXR_1$, where X represents a halogen atom, preferably chloride, and $R_1$ an alkyl group, linear or branched, containing from 1 to 10 carbon atoms. Specific examples are Mg-dichloride, Mg-ethyl-, or -propyl-, or -butyl-, or -hexylchloride.

The optionally used Ti-alkoxides suitable for this purpose are defined by the formula $Ti(OR)_m X_n$, where (OR) are alkoxygroups, like ethoxy, propoxy, butoxy etc. groups and X a halogen atom, preferably chloride. The ratio between m to n can move from 4 to 1 when n passes from 0 to 3. It is also possible to use mixtures of the above mentioned Ti-alkoxides with Ti-tetrahalide. Specific examples are $Ti(OBu)_4$; $Ti(OBu)_3Cl$; $Ti(OBu)_2Cl_2$; $Ti(OBu)Cl_3$, $Ti(OProp)_4$; $Ti(OEt)_4$.

Specific solvents for the above mentioned Mg- and Ti-salts are esters, like ethylacetate, ethylformate; ketones, like acetone; alcohols, like ethyl alcohol, butyl alcohol, hexyl alcohol, benzyl alcohol, trichloroethyl alcohol; amides, like acetamide, dimethylformamide, dimethylacetamide; organic acids, like benzoic acid, versatic acid, pelargonic acid, nonanoic acid. Preferably in this invention ethylacetate has been used.

The solution of Mg-halide, preferably Mg-dichloride, and, if present, of Ti-alkoxide, preferably Ti-tetrabutoxide, is obtained at a temperature ranging from 15° C. to the boiling point of the liquid phase, preferably from 50° C. to refluxing temperature for a period of 0.5 to 4.0 hours, preferably of 2 to 3 hours. In a preferred embodiment, Mg-dihalide or Mg-alkyl-halide is dissolved in ethylacetate in the presence of Ti-tetrabutoxide or Ti-halide-alkoxide.

The silica support, treated as above mentioned is preferably added to the solution of magnesium—and Titanium (if present)—salts, permitting the deposition into the silica support in a time from 0.15 hours to 2.0 hours, preferably of 0.5 hours to 1.0 hour at a temperature of 40° C. to reflux temperature, preferably around or higher than 75° C.

Under the above conditions the magnesium—and titanium (if present)—salts are totally or partially absorbed into the silica.

The amount of Mg-dichloride used according to the present invention is of 10 to 30% w. referred to the silica, preferably of 15 to 25% w. and of 1 to 3 g referred to 100 ml of ethylacetate, preferably from 1.5 to 2.5 g.

The amount of optionally used Ti-butoxide is of 100 to 300% w. referred to the silica, preferably of 150 to 250% w. and of 10 to 30 ml of the Ti compound (Ti-butoxide) referred to 100 ml of ethylacetate, preferably from 15 to 25 ml.

To complete this step, the liquid phase is removed by distillation, the solid matter washed with n-heptane and then with n-pentane, and finally dried.

In the third step, the precursor, obtained as above described, is added to a solution of a Mg-dialkyl or Mg-halogen-alkyl, preferably Mg-dihexyl diluted in n-heptane at 20% w.

The Mg-dialkyl added to the total amount of precursor is of 30 to 90 mM referred to 10 g of silica, preferably of 50 to 70 mM. Additionally, a donor was introduced into the solution, preferably diisobutylphthalate in an amount of 1.0 to 5.0 ml. The resulting suspension is kept at a temperature ranging from 20 to 60° C., preferably from 30° C. to 50° C., for a period of about 0.5 to 1.0 hour.

In the fourth step of the procedure according to the present invention, the suspension heated as above described is put in contact and interacted with one or more halogenating agents selected from halogenated hydrocarbons, like n-butylchloride, chloroform, trichloroethane, dichloroethane, dichloromethane; or $SiCl_4$, $SnCl_4$, $Cl_2$, etc. Among these, a mixture of n-butylchloride and chloroform is preferred.

The ratio between chloroform and n-butyl-chloride is optional, preferred is the value of about 2 to 1 in volume.

The amount of halogenating agent can be of 1000 ml for an amount of 50 to 100 g of solid matter (precursor), preferably of 65 to 75 g.

The time necessary for halogenating the Mg-alkyl and the optionally used Ti-alkoxide varies from 1 h to 3 h, preferably from 1.5 h to 2.5 h, the temperature from 40° C. to the boiling point of the diluent, preferably from 60° C. to reflux temperature.

It is further preferred, to contact the catalyst precursor with, e.g., di-iso-butylphthalate as a donor or Lewis base before the halogenating step.

At the end of the halogenating treatment, the solid is separated from the suspension, for example by sedimentation and siphoning, filtration or centrifugation, and washed with a solvent, such as a liquid aliphatic hydrocarbon solvent, and dried.

In the fifth step of the procedure, according to the present invention, the halogenated precursor of the fourth step is submitted to titanation. Thereby it is preferred to submit the solid catalyst component obtained in step 4 to one or more treatments with Ti-tetrachloride, concentrated or diluted in aliphatic or aromatic hydrocarbons, in presence of a Lewis base.

More specifically, the procedure is carried out with an excess of Ti-tetrahalide, preferably of Ti-tetrachloride by suspending the precursor obtained as above mentioned.

The operating temperature varies from 70° C. to 135° C., preferably from 90° C. to 120° C. for a period from 0.5 to 4.0 hours, preferably from 1 hour to 3 hours.

According to the present invention a Lewis base, like diisobutylphthalate, is added to Ti-tetrahalide in a preferred amount of 2.0 to 3.0 ml referred to 10 g of Silica used for the preparation.

Lewis bases can be, e.g., esters, ethers, amines, alkoholates, amides, preferably diisobutylphthalate.

After removing the supernatant Ti-tetrahalide, the Ti-tetrahalide treatment is repeated preferably twice, and finally, before recovering the solid catalyst component, the precursor is submitted to treatments with a liquid aliphatic hydrocarbon to dissolve and remove traces of Ti-tetrahalide, and dried.

The invention further concerns a solid catalyst component for the polymerization of olefins, obtained by the reaction steps:

a) contacting a silica support with a solution of Mg-halide or Mg-alkyl-halide or a mixture of both, optionally in the presence of Ti-alkoxide or Ti-halide-alkoxide or a mixture of both, b) contacting the catalyst-precursor obtained in (a) with Mg-alkyl or Mg-alkyl-halide or a mixture of both, optionally in the presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of an electron-donor compound, e) recovering the solid catalyst-component from the reaction products of step (d).

According to the present invention, step (a) and step (b) can also be combined together. The solid catalyst component shows preferably this composition:

| Silica support | | 27–87, 5% w. | esp. | 55–65 % w. |
|---|---|---|---|---|
| Catalytic active part: | Mg | 2–10% w | esp. | 5.0–9.0 % w. |
| | Cl | 9–47% w | esp. | 24–28% w. |
| | Ti | 1.0–6% w | esp. | 1.5–4% w. |
| | Lewis base | 0.5–10% w | esp. | 1.0–6% w. | wherein the titanium is almost completely in its tetravalent form.

The present invention relates moreover to a catalyst for the stereospecific polymerisation of α-olefins, which contains: A-a solid catalyst-component as described above; B-aluminiumtrialkyl or -haloalkyl, preferably Al-trialkyl or Al-chloroalkyl; C-an electron donor, preferably selected from alkoxy-silane derivatives.

The solid catalyst component or the catalyst as described above can be advantageously used in bulk, slurry or gas phase processes for the preparation of polyolefins by homopolymerization or copolymerization with two or more monomers. The catalyst can be used also in the polymerization of ethylene as it is or omitting internal and external donors.

The present invention further relates to a process for the preparation of polyolefins by homopolymerization or copolymerization of olefins, wherein a solid catalyst component or catalyst as described above is used. The polymerization is conducted according to conventional methods, operating in a liquid phase, either in the presence or in the absence of an inert hydrocarbon diluent, or in gas phase.

The catalyst of the invention can be used also at higher temperatures, whereby the polymerization is preferably carried out at a temperature of about 20° to 150° C., more preferred between 70° C. and 120° C., at atmospheric pressure or at a higher pressure, in absence or in presence of hydrogen.

The catalyst of the present invention is highly active and highly selective, permitting one to achieve very low values of extractable amorphous resins in boiling n-heptane and xylene.

Many other α-olefins can also be polymerised using this catalyst, like butene-1, 4-methyl-1-penten, hexene-1, alone or in mixture with other α-olefins for obtaining copolymers and terpolymers, mainly of rubber type.

The use of this catalyst permits one, moreover, to obtain controlled polymer particle size of the desired dimension on the basis of the choice of the selected silica.

Finally, this catalyst produces polypropylene resin at very high level of crystallinity due to the high selectivity and high stereoregularity.

EXAMPLE 1

10 g of microspheroidal silica, treated at 725° C. for 8 h, with a surface area of 280–355 m$^2$/g, pore volume of 1.57 ml/g, and particles diameter of 30 μm, are introduced into a flask containing a solution of 2.0 g of μ-Mg-dichloride, 10 ml of Ti-tetrabutoxide plus 3.3 ml of Ti-tetrachloride in 200 ml of ethylacetate.

The slurry is left to contact under stirring for 0.5 hours at the boiling point of the diluent.

The solid is recovered by evaporating the solvent and washed twice with 200 ml of n-heptane and twice with 200 ml of n-pentane. The hydrocarbon diluents are removed and the precursor dried.

76 mM of Mg di-hexyl diluted with n-heptane (20% V) and 2.4 ml of di-iso-butylphthalate are added to the solid matter, stirring for 45 minutes at 40° C.

A mixture of 100 ml of chloroform and 40 ml of n-butylchloride are introduced into the flask and reacted for 2 hours at 70° C., still under stirring, then the liquid is siphoned and the precursor washed and dried. 60 ml of Ti-tetrachloride are added at room temperature to the thus obtained solid, and the suspension is slowly heated to 90° C. When the temperature has reached the mentioned value, 2.3 ml of diisobutylphthalate are added dropwise while increasing the temperature to 110° C. under stirring. After filtering at 110° C., the same treatment with Ti-tetrachloride without diisobutylphthalate is carried out twice.

The liquid is finally siphoned at 110° C. and the solid matter washed 5 times with 200 ml of n-heptane at 85° C. for 0.5 hours each time.

After twice washing treatment with n-pentane at room temperature, the catalyst is dried.

19.39 g of a violet solid component were obtained, containing 28.0% w of Cl, 7.40% w of Mg and 3.3% w of Ti.

The activity and stereospecifity of this solid catalyst component were determined in runs of propylene polymerization in liquid monomer, using as a cocatalyst aluminum-trialkyls treated with electron-donor compounds.

An autoclave of 5 liters equipped with a magnetic stirrer was used. The polymerization temperature was 85° C., the amount of propylene 2000 ml and the time two hours. Hydrogen (10000 ml) was present as molecular weight modifier.

An amount of about 52.9 mg of solid catalyst component was charged into the autoclave using as a co-catalyst an amount of Al-triethyl corresponding to an Al/Ti molar ratio (m.r.) of 100 and an electron donor (D=dicyclopentyldimethoxysilane) corresponding to an Al/D m.r.=20.

At the conclusion of the polymerization, the remaining propylene was flashed out and the polymer was then dried in nitrogen atmosphere at about 70° C.

A yield equal to 15.95 kg PP per gram of solid component of catalyst and to 478 kg PP per gram of Titanium were obtained with the following characteristics:

| MFI (2.16 kg; 230° C. ASTM D1238 L) | = | 13.33 |
|---|---|---|
| Bulk density . . . g/ml | = | 0.46 |
| Isotactic index | = | 98.0 |
| Xylene soluble % w | = | 2.69 |

$^{13}$C-NMR spectra were recorded on an AM 250 Bruker spectrometer operating in FT mode at 62.89 M.Hz and 39 K in inverse Gated mode of decoupling with a relaxation delay of 7 sec, finding a value of 0.97$_4$ in "mmmm" pentads composition in the polypropylene powder.

The polymerization test run was repeated at an Al/D m.r=10, achieving a yield equal to 15.27 kg PP per g of solid component of catalyst and to 463 kg PP per gram of Titanium, with the following characteristics:

| MFI (2.16 kg: 230° C. ASTM D 1238 L) | = | 8.23 |
|---|---|---|
| Bulk density . . . g/ml | = | 0.48 |
| Isotactic index | = | 98.6 |
| Xylene soluble % | = | 1.63 |

EXAMPLE 2

10 g of microspheroidal silica, as described in example 1 and with the same characteristics, are introduced into a flask containing a solution of 1.57 g of α-Mg-dichloride, 31 ml of Mg-dihexyl and 2.7 ml of di-iso-butylphthalate in 150 ml of ethylacetate.

The slurry is left to contact under stirring for 1 hour at the boiling point of the diluent. The solid is recovered by evaporating the solvent. Then 100 ml of chloroform and 40 ml of n-butyl-chloride are introduced into the flask and reacted for 2 hours at 70° C., still under stirring. Then the liquid is siphoned and the obtained precursor washed twice with n-heptane, twice with n-pentane and dried.

The catalyst preparation was completed after this step as described in example 1. 17.47 g of a brown solid component were obtained, containing 24.2% w of Cl, 6.24% of Mg and 3.17% of Ti.

A polymerization test run was carried out at Al/D=20 in presence of 10000 ml of H2, as reported in example 1.

A yield equal to 15.41 kg PP per g of solid component of catalyst and equal to 486 kg PP per g of Ti was achieved, with the following characteristics:

| | | |
|---|---|---|
| MFI (2.16 kg; 230° C. ASTM D 1238L) | = | 2.85 |
| Bulk density g/ml | = | 0.44 |
| Isotactic index | = | 99.4 |
| Xylene soluble % w | = | 1.06 |

What is claimed is:

1. Method for the preparation of a solid catalyst component which is active in the polymerization of olefins, comprising the steps of:
    a) contacting a thermally treated silica support, wherein at least a part of the hydroxyl groups is eliminated by said thermal treatment, with Mg-halide or Mg-alkyl-halide or a mixture of both in a solvent, optionally in the presence of Ti-alkoxide or Ti-halide-alkoxide or a mixture of both, to form a catalyst precursor,
    b) contacting the catalyst precursor obtained in a) with Mg-alkyl or Mg-alkyl-halide or a mixture of both, optionally in the presence of Lewis base, or, instead of above steps a) and b), a/b) contacting a thermally treated silica support, wherein at least a part of the hydroxyl groups is eliminated by said thermal treatment, with a solution of Mg-halide or Mg-alkyl-halide or a mixture of both and Mg-alkyl, optionally in the presence of Ti-alkoxide or Ti-halogen-alkoxide or a mixture of both, and optionally in the presence of Lewis base to form a catalyst precursor,
    c) halogenating the catalyst precursor obtained in b) or a/b) by contact of said catalyst precursor with halogenating agent,
    d) titanating the product obtained in c) with Ti-tetrahalide in the presence of Lewis base,
    e) recovering the solid catalyst component from the reaction product of step d).

2. Method according to claim 1, wherein in step a) or a/b), microspheroidal silica is used with a particle size of 15 to 150 microns, a surface area of 100 to 500 m²/g, a pore volume of 1.2 to 3.0 ml/g.

3. Method according to claim 1, wherein in step a) or a/b), Mg-dihalide or Mg-alkyl-halide is dissolved in ethyl acetate, optionally in the presence of Ti-tetrabutoxide or Ti-halide-alkoxide.

4. Method according to claim 1, wherein the halogenating agent is chlorinated hydrocarbon.

5. Method according to claim 1, wherein a mixture of chloroform and butylchloride is used as halogenating agent.

6. Method according to claim 1, wherein in step b) or a/b), the catalyst precursor is optionally contacted with diisobutylphthalate.

7. Method according to claim 1, wherein the solid catalyst component obtained in step c) is subjected to one or more treatments with Ti-tetrachloride, concentrated or diluted in aliphatic or aromatic hydrocarbons, in the presence of Lewis base.

8. A solid catalyst component for the polymerization of olefins, obtained by the following reaction steps of:
    a) contacting a thermally treated silica support, wherein at least a part of the hydroxyl groups is eliminated by said thermal treatment, with a solution of Mg-halide or Mg-alkyl-halide or a mixture of both, optionally in the presence of Ti-alkoxide or Ti-halide-alkoxide or a mixture of both, to form a catalyst precursor,
    b) contacting the catalyst precursor obtained in a) with Mg-alkyl or Mg-alkyl-halide or a mixture of both, optionally in the presence of Lewis base, or, instead of above steps a) and b), a/b) contacting a thermally treated silica support, wherein at least a part of the hydroxyl groups is eliminated by said thermal treatment, with a solution of Mg-halide or Mg-alkyl-halide or a mixture of both and Mg-alkyl, optionally in the presence of Ti-alkoxide or Ti-halogen-alkoxide or a mixture of both, and optionally in the presence of Lewis base,
    c) halogenating the catalyst precursor obtained in b) or a/b) by contact of said catalyst precursor with halogenating agents,
    d) titanating the catalyst precursor obtained in c) with Ti-tetrahalide in the presence of Lewis base,
    e) recovering the solid catalyst component from the reaction products of step d).

9. The solid catalyst component according to claim 8, containing 27 to 87.5% by weight silica, 2.0 to 10.0% by weight Mg, 9 to 47% by weight Cl, 1.0 to 6.0% by weight Ti, and 0.5 to 10.0% by weight of Lewis base.

10. Catalyst for the polymerization of olefins, containing a solid catalyst component as claimed in claim 8, an Al-trialkyl or an Al-halogen-alkyl and Lewis base.

11. Catalyst according to claim 10, where the Lewis base is an alkoxysilane.

12. A method for the polymerization or copolymerization of olefins which comprises contacting olefin monomer with a catalyst containing a component according to claim 8, at a temperature of 20° C. to 150° C.

13. The method according to claim 12 wherein the temperature is from 70° C. to 120° C.

14. The method according to claim 12 wherein comonomer is copolymerized with said monomer.

* * * * *